United States Patent
Kagiwada et al.

[11] 4,012,120
[45] Mar. 15, 1977

[54] GUIDED WAVE ACOUSTO-OPTIC DEVICE

[75] Inventors: Reynold S. Kagiwada, Los Angeles; David B. Hall, Manhattan Beach, both of Calif.

[73] Assignee: TRW Inc., Redondo Beach, Calif.

[22] Filed: May 14, 1975

[21] Appl. No.: 577,266

[52] U.S. Cl. .......................... 350/161 W; 235/181; 333/30 R; 350/96 WG

[51] Int. Cl.[2] .................... H03H 9/26; H03H 9/32; G02F 1/11; G06F 7/56

[58] Field of Search ........... 333/30 R, 72; 350/161, 350/96 WG; 310/8, 8.1, 8.2, 9.7; 332/2, 26; 235/181

[56] References Cited

UNITED STATES PATENTS

| | | | |
|---|---|---|---|
| 3,633,995 | 1/1972 | Lean et al. | 350/161 |
| 3,655,261 | 4/1972 | Chang | 350/96 WG |
| 3,736,044 | 5/1973 | Lean | 350/161 |

OTHER PUBLICATIONS

Lean–"Optical Correlation and Heterodyne Detection of Compressed Pulses" in IBM Technical Disclosure Bulletin, Jan. 1969; pp. 899–901.

Tao–'Dynamic Control of Laser Deflection by Acoustic Surface Waves' in IBM Technical Disclosure Bulletin, Nov. 1970; p. 1603.

*Primary Examiner*—Alfred E. Smith
*Assistant Examiner*—Marvin Nussbaum
*Attorney, Agent, or Firm*—John J. Connors; Edwin A. Oser; Donald R. Nyhagen

[57] ABSTRACT

An acousto-optic device suitable as a correlator, convolution integrator or Fourier transform device. The device comprises a piezoelectric substrate or crystal such as lithium niobate. The substrate is covered by a thin, outer layer having higher index of refraction than the substrate and a thickness on the order of 50 micrometers. Two acoustic transducers such as interdigital transducers are disposed on opposite ends of the crystal to launch two acoustic surface waves in opposite directions. A laser beam is guided through the outer layer and is coupled with the two acoustic waves to generate either a correlation function, a Fourier transform or a convolution integral depending on the signals impressed thereon.

9 Claims, 4 Drawing Figures

GUIDED WAVE ACOUSTO-OPTIC DEVICE

BACKGROUND OF THE INVENTION

This invention relates generally to guided wave acousto-optic devices and particularly to such a device suitable to provide a correlation function, Fourier transform or convolution integral.

In up-to-date communication systems spread spectrum techniques are used because they have various advantages. They are less susceptible to interfering signals, provide better signal-to-noise ratios and have processing gain and better time revolution. Among these spread spectrum techniques are spread spectrum codes which may have a length of 500 bits. Such a group code is usually a pseudo random code.

In the past it has been proposed to process such codes by digital, large-scale integration (LSI) structures. Also, programable tapped surface acoustic wave delay lines have been proposed for this purpose. However, such digital LSI devices handling code lengths of 500 bits are limited to bit rates of a few megabits per second and have a rather high power consumption. On the other hand, the programable acoustic wave filters have high bit rates which may be as high as 10 megabits per second and can receive code sequence lengths of over 100 bits. However, they are difficult to manufacture because a large number of connections must be made in a very limited space.

Various optical correlators have been proposed in the past. For example, a paper by Slobodin which appears on page 1782 of Proceedings of the IEEE, December 1963, discloses an optical correlator. A light beam is sent through an acoustic wave generated in a liquid by a quartz transducer. The output is collected by a phototube. The thus generated acoustic wave is compared to a film replica disposed in the liquid.

A similar system has been proposed in a paper by Atzeni et al. which appears on pages 501 to 502 of Proceedings of the IEEE, March 1970. It has also been suggested to provide a correlation detector by sending the light beam through two spaced acoustic columns travelling in opposite directions which may, for example, be generated in two sapphire rods. This has been discussed in a paper by Squire et al. which was published by the Naval Undersea Warfare Center in May 1968. A similar system has been proposed in a paper by Montgomery et al. which appears in the IEEE 1973 Ultrasonic Symposium Proceedings on pages 553–557.

Surface wave filters in general have been discussed in a paper by Squire et al. which appears in IEEE Transactions, Volume MTT-17, No. 11, November 1969, pages 1020 – 1040. The surface wave filters are explained on page 1034 et seq.

An optical guided wave and its interaction with a surface acoustic wave has been discussed in a paper by Kuhn et al. which appears in Applied Physics Letters, Volume 17, No. 6 of Sept. 15, 1970, pages 265 to 267. The surface acoustic wave is propagated along a quartz crystal. A thin glass film is deposited on top of the crystal and serves as an optical wave guide. The light beam is coupled to the glass film by a grating coupler. The optical guided wave is then deflected by the surface acoustic wave. In this case, however, there is only a single acoustic wave and the light beam must be specially coupled to the surface layer.

Guided optical waves in lithium niobate have been disclosed in a paper by Schmidt et al. which appears in Applied Physics Letters, Volume 23, No. 8, Oct. 15, 1973, pages 417 – 419. A surface acoustic wave is launched in the lithium niobate crystal. The crystal is outdiffused to provide a surface layer with increased index of refraction. The light wave is launched into the outdiffused surface layer by rutile prism couplers.

Also, real time convolution of two signals has been obtained in a setup described in a paper by Kramer et al. which appears in Applied Physics Letters, Volume 25, No. 4 Aug. 15, 1974, pages 180 – 183. Here two surface acoustic waves are launched in a lithium niobate ($LiNbO_3$) delay line. However, the light beam is sent through the polished side wall into the center of the crystal. Thus the light beam is not a guided optical beam.

A recent paper to Tsai et al. which appears in Applied Physics Letters, Volume 26, No. 4 of Feb. 15, 1975, pages 140 – 142 relates to an acousto-optica guided light-beam device utilizing two tilting surface acoustic-waves. The device may be used as a modulator, switch, or deflector and utilizing an outdiffused surface layer of a lithium niobate plate to guide a light beam. The light beam is coupled into the surface layer by an input prism and a similar prism is used to couple the light beam out of the device. The two acoustic waves are tilted with respect to each other. No reference is made to a correlator nor would the device function as such.

It is accordingly an object of the present invention to provide an acousto-optic device suitable for obtaining the correlation function, Fourier transform or convolution integral of two signals which is characterized by a bit rate greater than 10 megabits per second and capable of handling more than 500 bits of code length.

It is accordingly an object of the present invention to provide such a device capable of operating within an acoustic frequency range of approximately 100 megahertz (mhz) to approximately one gigahertz (ghz).

Another object of the present invention is to provide a device of the character disclosed which has a surface layer having a thickness on the order of 50 micrometers (0.05 millimeter) and which is capable of interacting with great efficiency with a surface acoustic wave, thereby to improve the signal-to-noise ratio.

SUMMARY OF THE INVENTION

An acousto-optic device in accordance with the present invention comprises a piezoelectric substrate or crystal. This may, for example, consist of lithium niobate ($LiNbO_3$). Alternatively, lithium tantalate may be used ($LiTaO_3$) or quartz. Generally, however, any material which will support a surface acoustic wave may be used as a substrate while the surface layer may consist of any material which will support both a surface acoustic wave and an optical guided wave.

The crystal may have an outer layer disposed thereon which has a higher optical index of refraction than the substrate. The outer layer has a thickness on the order of 50 micrometers to provide a optical waveguide. However, it is not necessary that the crystal has a separate outer layer but the outer layer may simply consist of an outdiffused material having a different optical index of refraction.

Two acoustic transducers such as interdigital transducers can launch each a surface acoustic wave, the waves travelling in opposite directions. However, it is not necessary that the two surface waves are displaced from each other as long as they travel in opposite directions.

Finally, a laser is provided for generating a laser beam. The laser beam is expanded to have a wide aperture which may be on the order of 0.1 inch to 4 inches wide. This wide aperture laser beam is directed into the surface layer substantially parallel to its surface and substantially at right angles to the direction of travel of the acoustic surface waves. The laser beam may then be diffracted at the Bragg angle and the diffracted laser beam carries information concerning the two signals which generate the acoustic waves. It is not necessary that the laser beam be diffracted at the Bragg angle and any other form of interaction between the acoustic waves and the light beam is possible.

For example, in order to obtain a correlator a received signal is impressed on one of the transducers while a previously stored, time reversed signal is impressed on the other transducer. When there is correlation between the two signals a square law detector will generate a large output pulse.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
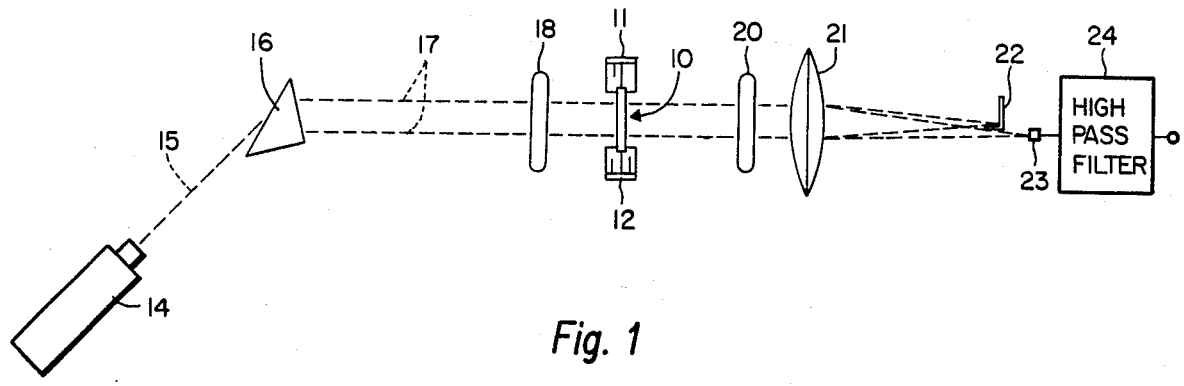
FIG. 1 is a schematic elevational view of the acousto-optic system of the present invention including the laser beam and its lenses.

Referring now to the drawings and particularly to FIG. 1, there is illustrated an acousto-optic system in accordance with the present invention. There is illustrated schematically at 10 the acousto-optic correlator structure on which are launched the surface acoustic waves by two input devices 11 and 12. A Coherent light beam is generated, for example, by a laser 14 which may, for example, consist of a helium-neon laser. The laser output beam 15 is then expanded by a beam expanding prism 16 to generate a relatively wide laser beam 17. This wide laser beam 17 is narrowed down by a cylindrical lens 18 into a very thin sheet capable of being endfired into the thin surface layer of the structure 10. After the light beam 17 has passed the structure 10 it is again expanded and collimated by a cylindrical lens 20 and is subsequently focused by a spherical lens 21.

The undiffracted beam is stopped by an aperture stop 22 which may be a knife edge. The deflected beam is impressed upon a square law detector 23 which may, for example, be a PIN detector which is a high speed detector with a very small diameter. The output signal of the detector 23 may be passed through a high pass filter 24 to eliminate the direct-current and low-frequency components which are not desired.

Before further explaining the theory and operation of this system of FIG. 1 reference will now be made to FIGS. 2 and 3 to explain the structure on which the two surface acoustic waves are launched which are then coupled to the laser beam 17. FIG. 2 again shows the structure 10 with the input devices 11 and 12. The structure 10 consists of a piezoelectric crystal or substrate 26. Upon the substrate 26 there is provided a surface layer 27 having a high index of refraction.

Figure 4:
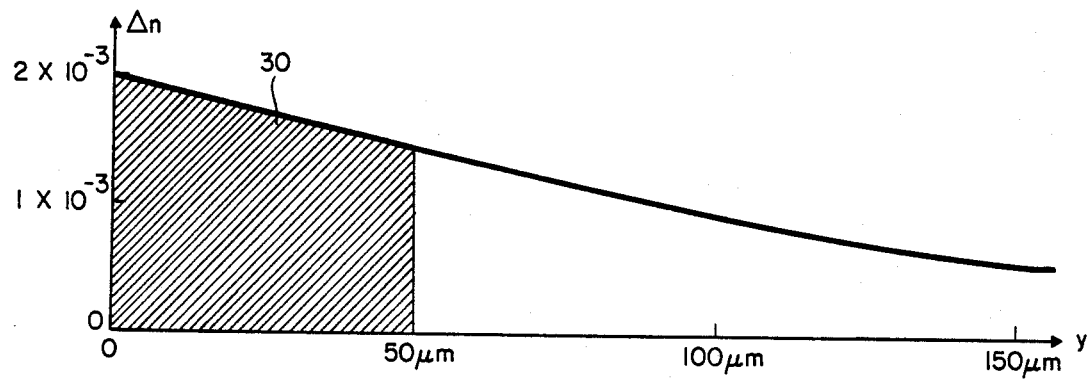
FIG. 4 is a graph illustrating the index of refraction of the surface layer as a function of distance from the top of the surface layer into the substrate.

Such a surface layer may, for example, be manufactured in the following manner. Assuming the crystal 26 to consist of lithium niobate, the crystal is now heated in a vacuum at 1,100¼C (centigrade) for several hours. The crystal then becomes black. Subsequently, the crystal is again heated for about eight hours at the same temperature in air or oxygen until the crystal becomes clear. This will now increase the index of refraction of the surface layer 27 or specifically the extraordinary index of refraction. This has been plotted in FIG. 4 where the abscissa shows the change of the index of refraction ($\Delta n$), while the ordinate shows distance from the surface into the crystal. It will be evident that the shaded area 30 indicates a relatively large change of the index of refraction by about $2 \times 10^{-3}$ up to a depth of approximately 50 micromseters. Beyond that the change of the index of refraction becomes rather small.

It wil be evident that in this manner the lithium niobate is outdiffused to provide a gradual change of the index of refraction. Alternatively, it is possible to provide the outer layer 27 by sputtering ground glass or soda lime glass over the piezoelectric substrate. In this case there is an abrupt change of the index of refraction between layers 26 and 27. In any case, the surface layer should have a higher index of refraction than the substrate. In this connection reference is made to the paper by Kuhn et al. above-referred to.

It is to be distinctly understood that the crystal 26 may consist of any material capable of supporting an acoustic surface wave. The surface layer 27 should be capable of supporting both an acoustic surface wave and a guided optical wave. Thus as indicated before, layers 26 and 27 may consist of the same material having a surface layer with a different index of refraction.

In order to provide a correlator a received signal source 31 is coupled to the structure 10 by coaxial line 32 which then connects to a strip line 33 and an outer conductor 35. The strip line 33 and outer conductor 35 are in turn coupled to an acoustic transducer 34 such as an interdigital transducer. Since the physical size of the transducer 34 is so small, it has not been shown in detail. However, it will be understood that such interdigital transducer are quite conventional as shown e.g. in the paper by Kuhn et al. above referred to.

The other signal source 36 is a time reversed, stored signal. It is coupled through a coaxial line 37 to a strip 38 and outer conductor 39 which in turn are coupled to a second acoustic transducer 40. It will be noted that the two transducers 34 and 40 are disposed at opposite ends of the structure 10 and are laterally displaced from each other. However, it is not necessary that the two transducers 34 and 40 are laterally displaced from each other. All that is necessary is to direct the waves in such a manner that the acousto-optic interaction is a linear interaction. The transducers are capable of launching two acoustic waves in opposite directions parallel to each other. The structure 10 may be disposed on a metal fixture 41 as shown at FIG. 1. The wires 42 indicate the connections between the strip line 33 and outer conductor 35 and the transducer 34 or the strip line 38 and outer conductor 39 and the transducer 40 respectively.

Figure 2:
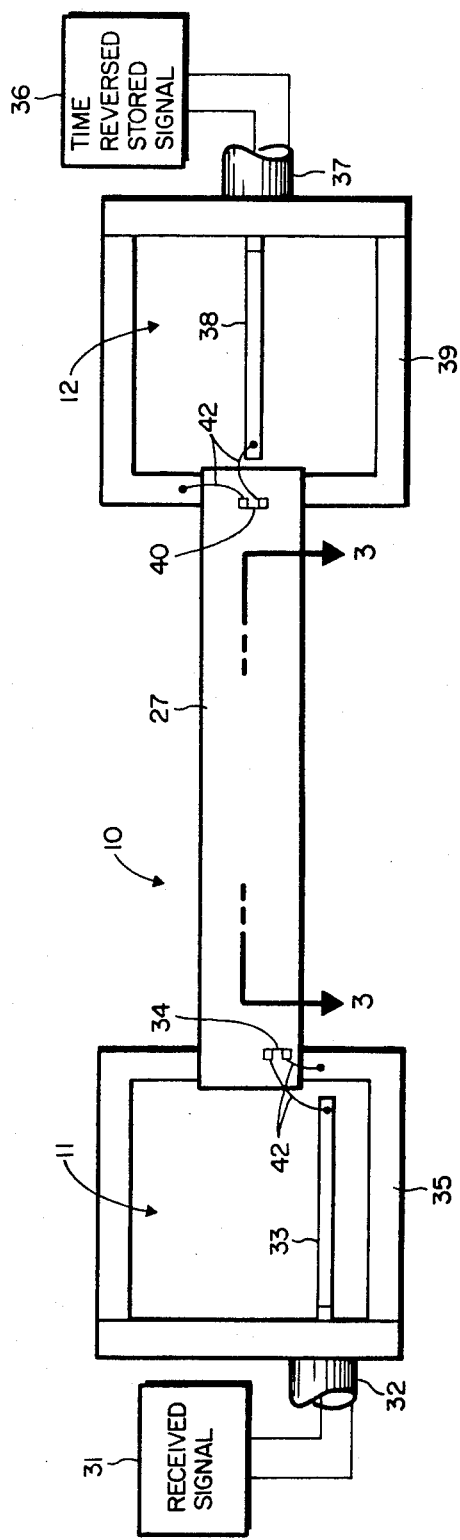
FIG. 2 is a top plan view on enlarged scale of the structure for generating the two acoustic waves and including the input signal sources.

Assuming that the device of the invention is to be used as a correlator the signals shown in FIG. 2 are applied thereto. The aperture of the laser beam 17 may be between about 0.1 inch and about 4 inches and the length of the crystal or substrate 26 should be accordingly. For example, if the crystal has an active interaction region having a length of 4 centimeters the transit time amounts to 12 microseconds. Due to the fact that the laser aperture is very wide, a wider interaction zone between the light beam and the surface acoustic wave is created. This makes it possible to process more acoustic information, that is to process more bits simultaneously.

As explained hereinbefore, a portion of the laser beam passes undeflected but the deflected portion of the laser beam which is deflected by the Bragg angle carries the information of interest. This deflection may amount to about 2.1°. The useful information is contained in an alternating current proportional to the following term:

$$S_1 S_2 \cos[2\omega_s t] \quad (1)$$

In the above term $S_1$ stands say for the received signal and $S_2$ for the time reversal of $S_1$. In that case a cross correlation spike is obtained at the detector 23. Further in this formula $\omega_s$ corresponds to the acoustic center frequency which may, for example, be 200 Mh while t is the time. It should be noted that one acoustic wave up-shifts the optical beam in frequency while the other wave down-shifts it. This is the reason why the useful alternating current output corresponds to twice the acoustic center frequency. Therefore, the high pass filter 24 is designed to remove the direct current portion as well as the low frequency output which is not desired.

Figure 3:
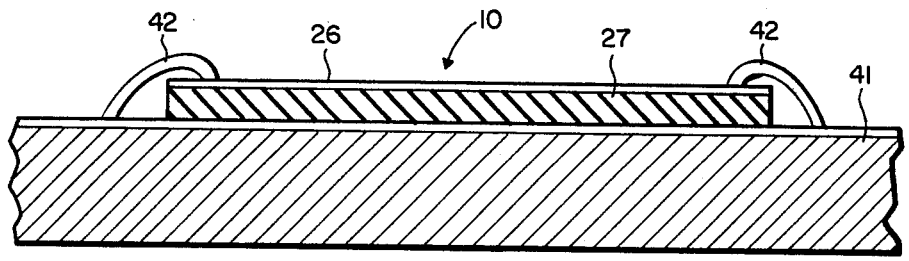
FIG. 3 is a cross-sectional view of the structure of FIG. 2 taken on line 3 — 3 of FIG. 2.

The structure illustrated in FIGS. 1 – 3 can handle code length of over 500 bits at process speeds up to 40 megabits per second. The acoustic power in this case amounts to 100 milliwatts.

Depending on the type of input signals used the device may also be useful to provide the Fourier transform of an input signal. On the other hand, it is also feasible to obtain the convolution integral of two input signals. In this case, the output is proportional to the following term:

$$\cos[2\omega_s t] S_1(\tau) S_2(2t-\tau) d\tau \quad (2)$$

In this formula the symbols have the same meaning as explained before.

The Fourier transform may, for example, be obtained by driving one acoustic wave by an envelope function times an up chirp. The other acoustic wave is driven by a down chirp. The terms up chirp and down chirp refer to frequency variation or modulation in one or the other directions. The output signal now represents the Fourier transform of the envelope function. Again when the chirp signals match optimum output is obtained.

There has thus been disclosed an acousto-optic device capable of operating as a correlator, generating a Fourier transform or a convolution integral. The device has a piezoelectric substrate or crystal on which acoustic surface waves are launched in opposite directions and adjacent to each other. A wide aperture coherent light beam is launched into the very thin surface layer of the device which operates as an optical light waveguide. Therefore, the interaction region between the light beam and the acoustic waves is maximized. This in turn improves the efficiency of the device and makes it capable of processing megabits per second and handling codes having a length of over 500 bits.

What is claimed is:
1. An acousto-optic device comprising:
 a. a substrate consisting of a material capable of supporting a surface acoustic wave;
 b. an outer layer disposed over said substrate and being capable of supporting both a surface acoustic wave and of guiding an optical wave, said outer layer having a higher optical index of refraction than that of said substrate and having a thickness on the order of 50 micrometers;
 c. a first interdigital transducer disposed on one end of said substrate for launching a first acoustic surface wave thereon;
 d. a second interdigital transducer disposed on the other end of said substrate for launching a second acoustic surface wave in a direction opposite that of said first wave;
 e. a source of signals coupled to each of said transducers;
 f. a laser for generating a laser beam; and
 g. means for expanding said laser beam to have a wide aperture and for directing it into said outer layer substantially parallel to the major surface thereof and substantially at right angles to the direction of travel of the acoustic surface waves, whereby a diffracted output laser beam carries information concerning the two signals.

2. An acousto-optic device as defined in claim 1 wherein a square law detector is disposed in the path of the diffracted laser beam.

3. An acousto-optic device as claimed in claim 2 wherein a high-pass filter is coupled to said square law detector for removing direct-current and low-frequency signal components.

4. An acousto-optic device as claimed in claim 2 wherein said means for expanding said laser beam includes a first cylindrical lens disposed in the path of said beam ahead of said substrate, a second cylindrical lens disposed in the path of said laser beam past said substrate and a spherical lens for focusing the diffracted light beam on said detector.

5. An acousto-optic device as defined in claim 1 wherein a received signal is coupled to said first transducer and a time-reversed, stored signal is coupled to said second transducer.

6. An acousto-optic device as defined in claim 1 wherein a stop is provided in the path of the output laser beam for intercepting the undeflected laser beam.

7. An acousto-optic interaction device comprising:
 a. a substrate capable of supporting an acoustic surface wave;
 b. said substrate having an outer layer of a predetermined thickness and of a higher optical index of refraction than that of the bulk of said substrate for guiding an optical beam therethrough;
 c. a first interdigital tranducer disposed on said substrate at one end thereof;

d. a second interdigital transducer disposed on the other end of said substrate, whereby said transducers are capable of launching two acoustic surface waves travelling in opposite directions for interaction with a light beam passing through said surface layer;

e. means for impressing a received signal on one of said transducers; and f. additional means for impressing a stored signal on the other one of said transducers.

8. A device as claimed in claim 7 wherein the thickness of said surface layer is no more than on the order of 50 micrometers.

9. A device as claimed in claim 7 wherein said substrate consists of lithium niobate having an outdiffused surface layer.

* * * * *